US012793424B2

(12) United States Patent
Golyshko et al.

(10) Patent No.: US 12,793,424 B2
(45) Date of Patent: Nov. 10, 2026

(54) DYNAMIC AUTOMATION OF SECURITY SYSTEM USING MACHINE LEARNING

(71) Applicant: Roku, Inc., San Jose, CA (US)

(72) Inventors: Philip Golyshko, Westminster, CO (US); Sunil Ramesh, Saratoga, CA (US); Gregory Garner, Key Colony Beach, FL (US); Patrick Brouillette, Tempe, AZ (US); David Lee Stern, Los Gatos, CA (US); Soren Riise, Templeton, CA (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 18 days.

(21) Appl. No.: 18/787,063

(22) Filed: Jul. 29, 2024

(65) Prior Publication Data

US 2026/0030890 A1 Jan. 29, 2026

(51) Int. Cl.

| | |
|---|---|
| ***G06V 20/52*** | (2022.01) |
| ***G16Y 20/10*** | (2020.01) |
| ***G16Y 20/40*** | (2020.01) |
| ***G16Y 40/10*** | (2020.01) |
| ***G16Y 40/50*** | (2020.01) |

(52) U.S. Cl.

CPC .............. *G06V 20/52* (2022.01); *G16Y 20/10* (2020.01); *G16Y 20/40* (2020.01); *G16Y 40/10* (2020.01); *G16Y 40/50* (2020.01)

(58) Field of Classification Search

None

See application file for complete search history.

(56) References Cited

U.S. PATENT DOCUMENTS

| | | | | |
|---|---|---|---|---|
| 9,449,229 | B1 * | 9/2016 | Laska | G08B 13/19606 |
| 2018/0012460 | A1 * | 1/2018 | Heitz, III | G08B 13/19682 |
| 2019/0253670 | A1 * | 8/2019 | Chien | F21K 9/232 |
| 2019/0318171 | A1 * | 10/2019 | Wang | G06V 10/454 |
| 2021/0029298 | A1 * | 1/2021 | Mysore | H04N 23/66 |
| 2023/0168668 | A1 * | 6/2023 | Giaconi | G05B 23/024 702/185 |
| 2023/0386207 | A1 * | 11/2023 | Amini | G06N 20/00 |
| 2024/0386754 | A1 * | 11/2024 | Shliefer | G07C 5/008 |
| 2025/0104550 | A1 * | 3/2025 | Ramesh | G08B 25/00 |
| 2026/0030890 | A1 * | 1/2026 | Golyshko | G06V 20/52 |

FOREIGN PATENT DOCUMENTS

| | | | | |
|---|---|---|---|---|
| CN | 115032910 A | * | 9/2022 | G06F 21/32 |
| CN | 117275156 B | * | 6/2024 | G07F 17/32 |

* cited by examiner

*Primary Examiner* — Fekadeselassie Girma

(74) *Attorney, Agent, or Firm* — Straylight LLP

(57) ABSTRACT

Aspects of the disclosed technology provide solutions for dynamically automating a security system using machine learning. An example method can include receiving sensor data collected by a sensor installed outside of an indoor location. The sensor data may include an indication of a motion event occurring within a predetermined distance from the indoor location. The method can include, based on user data associated with the indoor location, predicting, using a neural network, a user behavior in response to the motion event. The method can further include, based on the predicted user behavior, determining, using the neural network, an action comprising a response to the motion event implemented by one or more devices and automatically activating at least one of the device(s) to perform the action.

18 Claims, 10 Drawing Sheets

DYNAMIC AUTOMATION OF SECURITY SYSTEM USING MACHINE LEARNING

FIELD

This disclosure is generally directed to a security system, and more particularly to dynamically automating a security system using machine learning.

SUMMARY

Provided herein are system, apparatus, article of manufacture, method and/or computer program product embodiments, and/or combinations and sub-combinations thereof, for dynamically automating, using machine learning, a security system based on an understanding of a detected activity or condition and a status of a protected area or a user.

In some aspects, a method is provided for dynamically automating a security system using machine learning. The method can operate by receiving sensor data collected by a sensor installed outside of an indoor location. The sensor data may comprise an indication of a motion event occurring within a predetermined distance from the indoor location. In some cases, the method can further include based on user data associated with the indoor location, predicting, using a neural network, a user behavior in response to the motion event. In some examples, the method can also include based on the predicted user behavior, determining, using the neural network, an action comprising a response to the motion event by one or more devices. In some cases, the one or more devices can include one or more Internet-of-Things (IOT) devices. In some aspects, the method can further include automatically activating at least one of the one or more devices to perform the action.

In some aspects, a system is provided for dynamically automating a security system using machine learning. The system can include one or more memories and at least one processor coupled to at least one of the one or more memories and configured to receive sensor data collected by a sensor installed outside of an indoor location. The sensor data may comprise an indication of a motion event occurring within a predetermined distance from the indoor location. The at least one processor of the system can be configured to, based on user data associated with the indoor location, predict, using a neural network, a user behavior in response to the motion event. The at least one processor of the system can also be configured to, based on the predicted user behavior, determine, using the neural network, an action comprising a response to the motion event by the one or more devices. In some cases, the one or more devices can include one or more Internet-of-Things (IOT) devices. The at least one processor of the system can be configured to automatically activate at least one of the one or more devices to perform the action.

In some aspects, a non-transitory computer-readable medium is provided for dynamically automating a security system using machine learning. The non-transitory computer-readable medium can have instructions stored thereon that, when executed by at least one computing device, cause the at least one computing device to receive sensor data collected by a sensor installed outside of an indoor location. The sensor data may comprise an indication of a motion event occurring within a predetermined distance from the indoor location. The instructions of the non-transitory computer-readable medium can, when executed by the at least one computing device, cause the at least one computing device to, based on user data associated with the indoor location, predict, using a neural network, a user behavior in response to the motion event. The instructions of the non-transitory computer-readable medium can, when executed by the at least one computing device, cause the at least one computing device to, based on the predicted user behavior, determine, using the neural network, an action comprising a response to the motion event by one or moredevices. In some cases, the one or more devices can include one or more Internet-of-Things (IoT) devices. The instructions of the non-transitory computer-readable medium can, when executed by the at least one computing device, cause the at least one computing device to automatically activate at least one of the one or more devices to perform the action.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
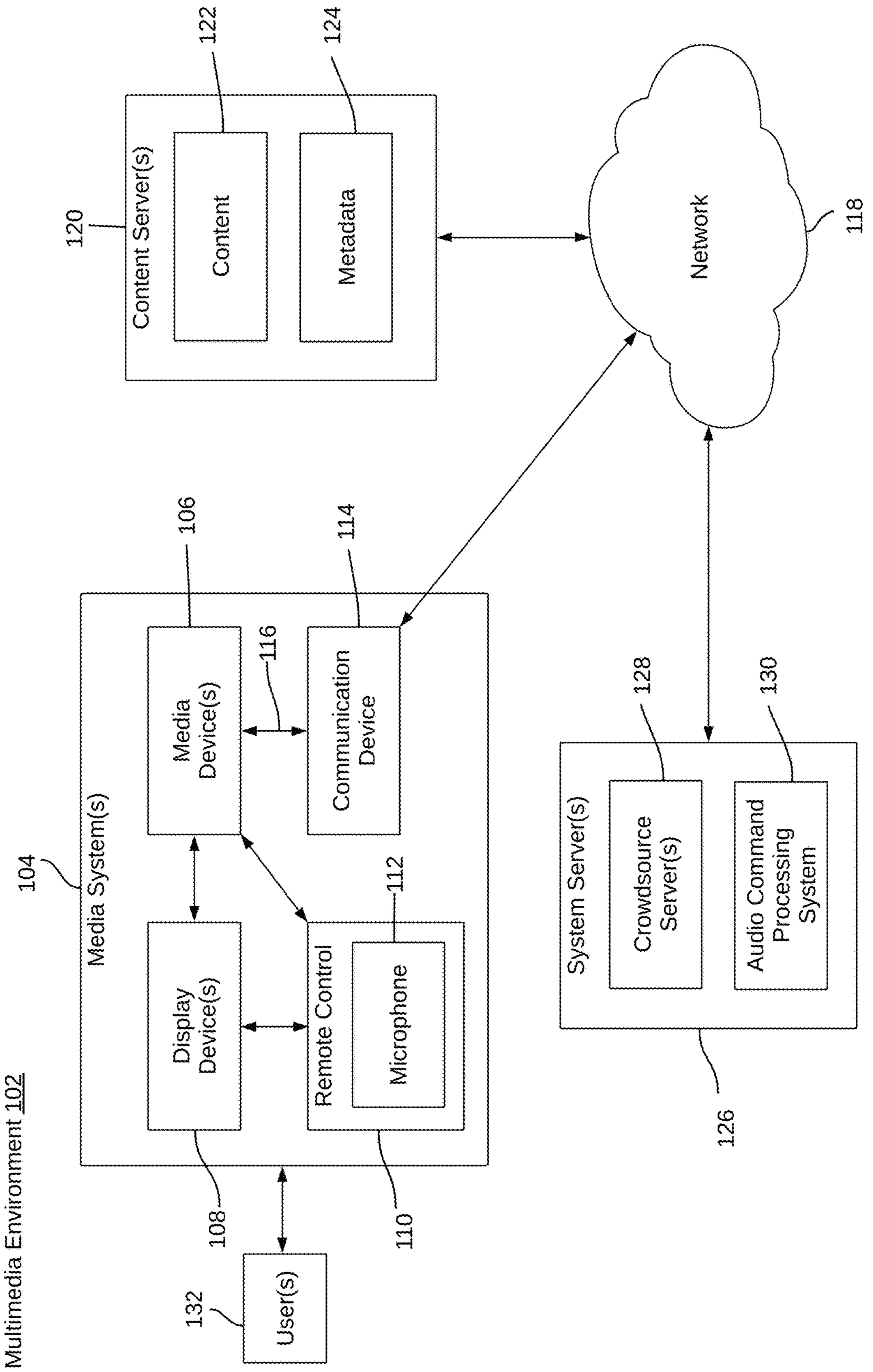
FIG. 1 illustrates a block diagram of an example multimedia environment, according to some examples of the present disclosure.

A security system can include a network of devices (e.g., Internet-of-Things (IOT) devices, etc.) that are designed to protect an area from unauthorized access. For example, various sensors, cameras, and/or alarms can be strategically placed inside and outside the protected area to monitor and detect activity (e.g., movement, sound, etc.) and/or trigger an alert for a user. A security system can be configured to allow users to control and manage their security systems remotely, for example, by speaking through a doorbell's microphone and speaker to visitors. However, a security system often requires some degree of manual input from a user such as, for example, responding to alerts, notifications, or alarms; adjusting settings such as schedules for arming/disarming the security system; and so on. Also, a security system can fail when the security system is unattended, or when a user is unavailable or cannot respond to the alert. While some actions can be pre-scheduled (e.g., automating at specific times) or triggered by pre-programmed rules (e.g., turning on lights when motion is detected), setting up a long list of automation rules and routines for various cases can be inefficient and limiting.

Provided herein are system, apparatus, device, method (also referred to as a process) and/or computer program product embodiments, combinations and/or sub-combinations thereof (also referred to as "systems and techniques" hereinafter) for dynamically automating a security system using machine learning. In some aspects, the systems and techniques described herein can be used to automatically and dynamically activate/deactivate a component of a security system based on the understanding of a context of a detected activity and/or a status of a protected area or a user. In some cases, a contextual understanding of the detected activity or condition and/or a status of the protected area or a user can be based on sensor data collected by sensors located outside and inside of the protected area, user data associated with the protected area, any applicable external data, or a combination thereof.

For example, the systems and techniques described herein can receive sensor data, which is collected by a sensor(s) installed outside of an indoor location (e.g., a building structure, a house, an office, a room, a store, etc.). The sensor(s) can be configured to capture/collect sensor data, which includes an indication of an activity or condition (e.g., motion, sound, or any environmental changes such as smoke, fire, flooding, temperature changes, and so on) that is occurring near the indoor location, for example, within a predetermined distance or radius from the indoor location.

Further, the systems and techniques described herein can access user data associated with the indoor location, which the systems and techniques described herein can use to predict a behavior or action of a user associated with the user data, as described herein. The user data can include, for example, user preferences, a purchase history or an expected delivery, a calendar, a daily pattern, contact information, social media activities, demographics information, user activity, location information, and so on. Further, the systems and techniques described herein may receive environmental data, which can be collected by a sensor(s) installed inside of the indoor location (e.g., a baby monitor, cameras placed in a room or a backyard, etc.). In some examples, the environmental data may indicate a status or condition of the indoor location (e.g., household, occupants, etc.).

In some examples, the systems and techniques described herein can analyze the sensor data, user data, environmental data, any applicable external data (e.g., traffic data, weather data, delivery status data, etc.), or a combination thereof to predict a user behavior in response to the detected activity or condition occurring near the indoor location. For example, a machine learning algorithm (e.g., neural network) can be used to generate a prediction of how a user would respond to the detected activity or condition based the sensor data, user data, environmental data, and/or any applicable external data.

The systems and techniques described herein can, based on the predicted user behavior, determine an action that can be performed/executed by a component of the security system (e.g., one or more IoT devices such as one or more smart locks, garage door openers, lights, speakers, etc.) to respond to the detected activity or condition. For example, the systems and techniques can determine an action that matches, mimics, or relates to a predicted user behavior (e.g., what a user would have done or how a user would have reacted in response to the detected activity or condition) and activate the component of the security system (e.g., one or more IoT devices, etc.) to perform the action.

As discussed in further detail below, the technologies and techniques described herein can improve the efficiency, functionality, and effectiveness of security systems by, for example, dynamically providing context-aware/situational automation(s) of the security systems, which can significantly reduce the amount of direct user interaction with the security systems and user reliance to manage and/or operate the security systems.

The present disclosure recognizes that the use of personal information and sensor data that depicts users and/or user activity can be used to the benefit of users. For example, personal information and/or sensor data can be used to better understand user behavior, facilitate and measure the effectiveness of applications and manage security systems. Accordingly, use of such personal information and sensor data enables calculated and automated control of the security systems. For example, the system and techniques described herein can adjust a behavior of a security system. Such changes to the security system can improve the user experience and the performance/operation of the security system. Further, other uses for personal information data that benefit the user are also contemplated by the present disclosure. The present disclosure further contemplates that the entities responsible for the collection, analysis, disclosure, transfer, storage, or other use of such personal information and sensor data should implement and consistently use privacy policies and practices that are generally recognized as meeting or exceeding industry or governmental requirements for maintaining personal information and sensor data private and secure. For example, personal information from users should be collected for legitimate and reasonable uses of the entity and not shared or sold outside of those legitimate uses. Further, such collection should occur after informed consent of the users. Additionally, such entities would take any needed steps for safeguarding and securing access to such personal information and sensor data and ensuring that others with access to the personal information and sensor data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, certain information such as personal and private information. Moreover, the present disclosure includes mechanisms which can be implemented to protect the privacy of users and anonymize data collected. Although the present disclosure may cover use of personal information and sensor data to implement one or more various disclosed embodiments, the present disclosure also contemplates that the various embodiments can also be implemented without the need for accessing and/or reporting such information and/or with protections to maintain the user's privacy. The various embodiments of the present technology are not rendered inoperable due to the lack of all or a portion of such information.

Various embodiments and aspects of this disclosure may be implemented using and/or may be part of a multimedia environment 102 shown in FIG. 1. It is noted, however, that multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

In some aspects, the multimedia environment 102 may be directed to multimedia surveillance and/or security systems. For example, multimedia environment 102 may include media system(s) 104, which can include, represent, or reside in a house, a building, an office, a garage, a patio, an entertainment center, a yard, a room, a hallway, a street, a driveway, a utility room, an ingress area, an egress area, a public space, a park, an airport, a structure, a hospital, or any other location or space where it is desired to implement a surveillance and security system with one or more sensors (e.g., a camera sensor, a microphone, etc.) to monitor the surrounding environment. User(s) 132 may interact with one or more components of the media system(s) 104 to consume the data (e.g., content, videos, images, sensor measurements, recordings, etc.) captured/collected by one or more sensors of the surveillance and security system.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IOT) device, and/or projector, to name just a few examples. In some examples, media device 106 can be a part of, integrated with, operatively coupled to, and/or connected to its respective display device 108.

In some examples, media device 106 may include, integrate, and/or communicate with one or more sensors implemented by a surveillance and security system such as a camera sensor (e.g., an image sensor of a camera such as a security camera, a smart camera, a doorbell camera, etc.). The surveillance and security system can use the camera sensor to monitor a scene (e.g., the surroundings) and record data depicting the scene (e.g., the surroundings) or a portion thereof. The data (e.g., recording, live feed, etc.) captured by such sensors can be sent to display device 108 for display to a user.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some examples, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, recording or live feed from a surveillance and security system, and/or any other content or data objects in electronic form.

In some examples, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing system 130. As noted above, the remote control 110 may include a microphone 112. The microphone 112 may receive audio data from users 132 (as well as other sources, such as the display device 108). In some examples, the media device 106 may be audio responsive, and the audio data may represent verbal commands from the user 132 to control the media device 106 as well as other components in the media system 104, such as the display device 108.

In some examples, the audio data received by the microphone 112 in the remote control 110 is transferred to the media device 106, which is then forwarded to the audio command processing system 130 in the system servers 126. The audio command processing system 130 may operate to process and analyze the received audio data to recognize the user 132's verbal command.

The audio command processing system 130 may then forward the verbal command back to the media device 106 for processing.

Figure 2:
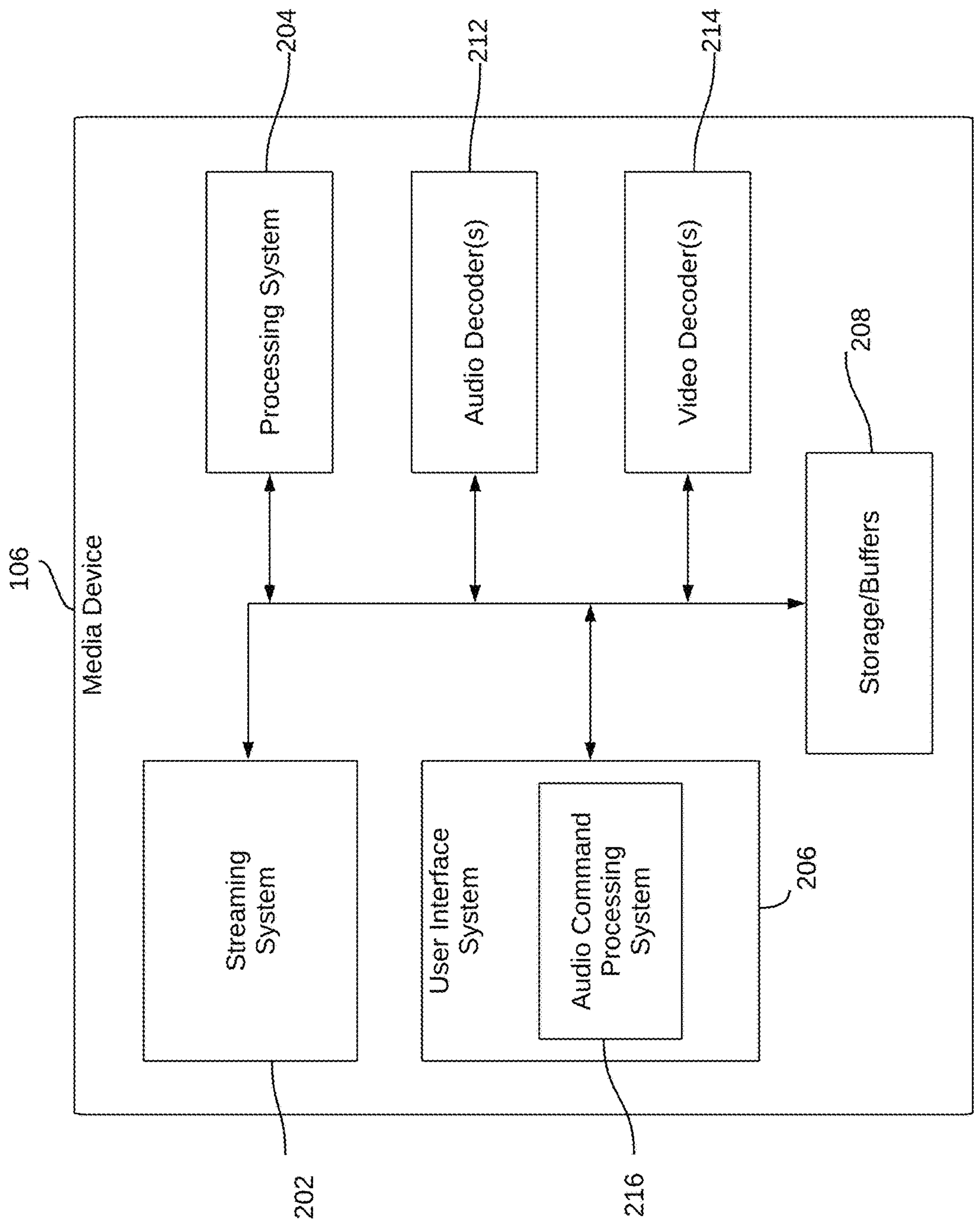
FIG. 2 illustrates a block diagram of an example streaming media device, according to some examples of the present disclosure.

In some examples, the audio data may be alternatively or additionally processed and analyzed by an audio command processing system 216 in the media device 106 (see FIG. 2). The media device 106 and the system servers 126 may then cooperate to pick one of the verbal commands to process (either the verbal command recognized by the audio command processing system 130 in the system servers 126, or the verbal command recognized by the audio command processing system 216 in the media device 106).

FIG. 2 illustrates a block diagram of an example media device 106, according to some embodiments. Media device 106 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, VVC, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, VVC, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some examples, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming system 202 of the media device 106 may request the selected content from the content server(s) 120 over the network 118. The content server(s) 120 may transmit the requested content to the streaming system 202. The media device 106 may transmit the received content to the display device 108 for playback to the user 132.

In streaming examples, the streaming system 202 may transmit the content to the display device 108 in real time or near real time as it receives such content from the content server(s) 120. In non-streaming examples, the media device 106 may store the content received from content server(s) 120 in storage/buffers 208 for later playback on display device 108.

Dynamic Automation of a Security System

Figure 3:
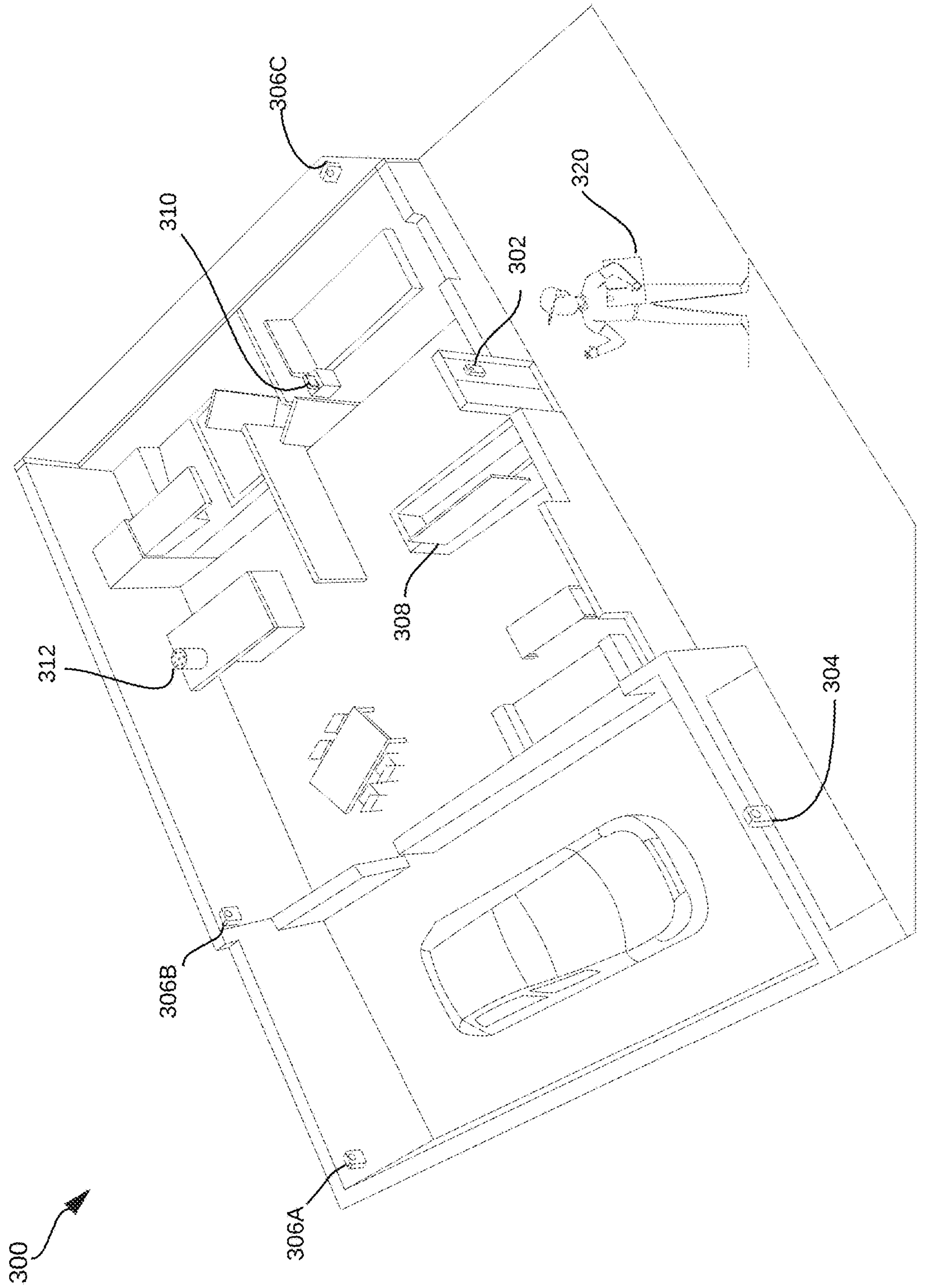
FIG. 3 illustrates an example environment that includes a security system with IoT devices, which can be dynamically controlled, according to some examples of the present disclosure.

FIG. 3 is an example environment 300 that includes a security system, which can be dynamically controlled using machine learning. While the example environment 300 illustrates a security system implemented at a house, the security system can be implemented at any applicable place such as a building structure, a commercial building, a garage, an office, a room, a retail space (e.g., a store), a restaurant, a school, a hallway, a patio, a balcony, a driveway, a yard, an airport, a park, a classroom, a hotel, a hospital, etc.

As shown, the example environment 300 includes a security system including various components (e.g., IoT devices, sensors, computing components, devices, etc.) that are installed outside and inside of the house, such as a doorbell 302, a garage security camera 304, cameras 306A-C, a television (TV) 308, alarm clock 310, and speaker 312. Though not shown in FIG. 3, non-limiting examples of IoT devices that can be installed in example environment 300 include microphones, lighting devices, light sensors, temperature sensors, movement/motion sensors, smoke detectors, fans, TVs, monitors, radios, display devices, garage door openers, smart locks, refrigerators, dishwashers, air conditioning units, sprinkler systems, actuators, pumps, and so on.

In some examples, doorbell 302 may include a camera sensor, a microphone, and a speaker. A camera (e.g., a video camera, an Internet Protocol (IP) camera, a thermal camera, a camera sensor, etc.) in doorbell 302 can be configured to monitor the surroundings and/or collect image data (e.g., still images, video frames) and/or audio data. For example, doorbell 302 may function to capture image and audio data of the scene or any object that may be present within the field-of-view (FOV) of the doorbell camera sensor. For example, doorbell 302 can, using a camera sensor, capture images and/or video frames depicting delivery person 320 who is approaching the front door of the house (e.g., the environment 300), a vehicle that is passing by the house, or any object, sound, motion, or event that may be occurring within a proximity of the camera sensor of the doorbell 302 (e.g., within a proximity of the front door of the house where the doorbell 302 is located).

The garage security camera 304 is installed above or near an outer/external side of the garage door of the house. The garage security camera 304 can monitor the surroundings of the garage security camera 304, such as a driveway of the house that is within the FOV of the garage security camera 304. For example, garage security camera 304 can capture image data (e.g., video frames, still images, etc.) and/or audio data of a scene, object, or event that is present or occurring within the FOV of garage security camera 304. For example, garage security camera 304 can monitor any vehicle, person, or object coming in or leaving the garage (e.g., an egress or ingress event), and/or any event or condition occurring near the driveway outside of the house.

The cameras 306A-C that are installed inside the house can be configured to collect sensor data (e.g., image and/or audio data) used to monitor an area(s) inside of the house in example environment 300. The sensor data captured by cameras 306A-C can be processed and analyzed to identify an individual, motion, movement, activity, event, object, etc., that may be occurring in the house. For example, cameras 306A-C can be used to determine the occupancy of the house (e.g., particular rooms of the house), a status or a type of activity of an occupant(s) in the house (e.g., a baby sleeping in a room, a family member in a video meeting or on the phone, a person watching TV, etc.), an event occurring in the house, an object in the house, characteristics of an indoor scene in the house, etc.

In some aspects, doorbell 302, garage security camera 304, cameras 306A-C, TV 308, alarm clock 310, speaker 312, and other components of the security system (e.g., IoT devices) in example environment 300 can communicate with each other without requiring intermediary servers, which enables real-time coordination between devices (e.g., via a local network, via peer-to-peer or ad hoc communications, etc.). For example, doorbell 302, garage security camera 304, cameras 306A-C, TV 308, alarm clock 310, and speaker 312 can collect and share data (e.g., image data, audio data, event data, etc.), and therefore, the exchange of data between devices and automated control and management of devices can be achieved. For example, a detection of a certain person within a proximity of doorbell 302 can trigger an activation of certain actions executed by other devices such as speaker 312, a garage door opener, a door lock, and so on.

Figure 4:
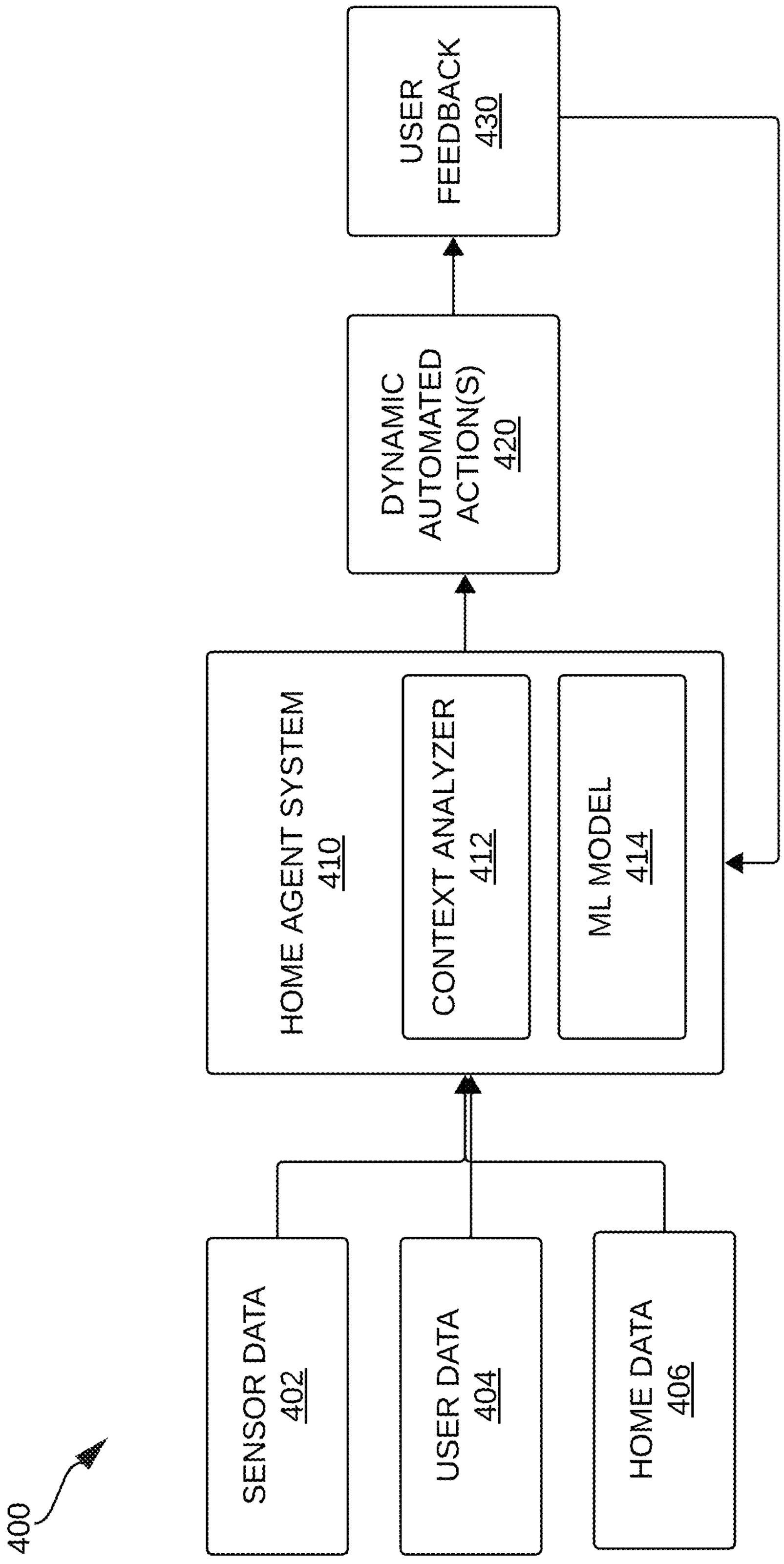
FIG. 4 illustrates an example system for determining dynamic automated actions for a security system, according to some examples of the present disclosure.

FIG. 4 illustrates an example system 400 for determining a dynamic/automated action(s) of a security system. As illustrated, system 400 includes home agent system 410 for generating a dynamic automated action(s) 420 based on sensor data 402, user data 404, and/or home data 406. The home agent system 410 can include context analyzer 412 and ML model 414 to process and analyze the sensor data 402, user data 404, and/or home data 406 and provide context-aware automated action(s) 420.

The various components of system 400 can be implemented at applicable places in the multimedia environment shown in FIG. 1. For example, home agent system 410 can be implemented by media systems 104 (e.g., media device(s) 106) and/or the system server(s) 126). Further, the home agent system 410 can be part of a security system installed in a building structure, a residential home, a commercial building, an office, a room, a retail space (e.g., a store), a restaurant, a school, a classroom, a hotel, a hospital, etc.

In some implementations, home agent system 410 can access sensor data 402 collected by a sensor(s) installed at a particular location, such as outside of an indoor location (e.g., doorbell 302 or garage security camera 304 as illustrated in FIG. 3). The sensor data 402 may include an indication of an event (e.g., motion, sound, etc.) that is present or occurring in the scene, for example, within a predetermined distance or radius from the sensor(s) used to collect the sensor data 402 (e.g., within a FOV of a camera sensor of doorbell 302, within a FOV of garage security camera 304, within a detectable range of a microphone of doorbell 302, etc.). For example, sensor data 402 can depict person 320 who is approaching a house where a sensor(s) used to collect sensor data 402 is located (e.g., a visitor, a delivery person, a solicitor, a household member, etc.), a vehicle (e.g., a delivery truck, a mail truck, a household member's vehicle, etc.) that is parked near the house or in the driveway, and so on.

In some aspects, home agent system 410 can access user data 404 associated with the house or user 132 as illustrated in FIG. 1. The user data 404 can include any rules or routines that user 132 has pre-programmed or pre-set up for a component(s) of the security system. In an illustrative example, preset rules or routines included in the user data 404 can include a rule specifying that an alert should be deactivated when a solicitor is activating (e.g., pressing) the doorbell 302, a rule granting access to the indoor location when an invited guest has arrived, or a routine for giving instructions to a delivery person. Further non-limiting examples of user data 404 can include contact information, an order history, a calendar, user preferences, a daily pattern, any owned vehicles, information about the house (e.g., characteristics of the house, etc.), user demographic data, location information, activity data, a user profile, data about one or more devices associated with a user, etc.

In some cases, home agent system 410 can access home data 406. In some examples, the home data 406 can include or provide information about the status of the inside of the indoor location, a configuration of the indoor location, a location associated with the indoor location, devices in the indoor location, preferences associated with the indoor location, etc. The home data 406 may include sensor data captured by one or more sensors installed inside the house (e.g., cameras 306A-C as illustrated in FIG. 3). Camera 306A can capture image and/or audio data of the garage. The image and/or audio data can include or provide information about the garage. For example, the image and/or audio data can show whether a vehicle is parked in the garage, whether a user drove a vehicle in the garage and left the house, any activity and/or event in the garage, a configuration of the garage, an object in the garage, and so on.

The camera 306B can capture image and/or audio data of the dining area or the living room. Such image and/or audio data can include or provide information about the dining area or living room. For example, the image and/or audio data can show whether a user or an occupant in the dining area or living room is watching TV 308, any activity and/or event in the dining area or living room, a configuration of the dining area or living room, an object in the dining area or living room, etc.

The camera 306C can capture image and/or audio data of the room. Such image and/or audio data can include or provide information about the room. For example, the image and/or audio data can show a status or activity of a user or an occupant of the room (e.g., whether a user or an occupant of the room is sleeping, working, etc.), any event and/or activity in the room, a configuration of the room, an object in the room, etc.

In some aspects, home data 406 can also include any applicable data associated with the house such as a floorplan/layout, household information (e.g., occupants, pets, etc.), interior features (e.g., levels, rooms, etc.), exterior features (e.g., pool, backyard, etc.), objects in the house, preferences associated with the house, a schedule associated with the house, a location of the house, a configuration of the house, a size of the house, a history of activity and/or events associated with the house, security information associated with the house, information about devices in the house, and so on, which can help home agent system 410 understand the context of house, such as the status of the house.

In some examples, home agent system 410 can receive external data (not shown) such as weather data, traffic data, delivery status data, Internet data, news information, neighborhood information, home owners association data, local events information, public alerts, etc., which can be received from an external source such as, for example, the Internet, an external server, an external database, a news feed, a government agency, a cloud storage system, an application platform, a remote device, etc. For example, home agent system 410 can receive delivery status data that indicates an expected delivery date and time to the house.

The context analyzer 412 can process and analyze, using ML model 414, sensor data 402, user data 404, home data 406, and/or external data, to determine dynamic/automated action(s) 420. In some cases, context analyzer 412 can analyze sensor data 402 to determine a condition or event occurring within a predetermined distance or proximity from the indoor location; detect an activity, event, object, and/or condition (e.g., motion, sound, or any environmental changes such as smoke, fire, flooding, temperature changes, and so on) that is present and/or occurring near the indoor location (e.g., within a proximity to the indoor location); and/or determine any other information related to a scene within a proximity of the indoor location. For example, the ML model 414 of the context analyzer 412 can use the sensor data 402 to perform object detection and/or recognition to detect and/or recognize an object measured or depicted by/in the sensor data 402, perform facial recognition to detect a user depicted in the sensor data 402, perform scene recognition to recognize a scene depicted in the sensor data 402, perform event detection and/or recognition to detect an event depicted in the sensor data 402, perform motion estimation to estimate motion measured or depicted in the sensor data 402, perform pattern recognition to detect one or more patterns measured or depicted in the sensor data 402, perform event or behavior prediction to prevent any events or behavior from the sensor data 402, perform localization to determine a location and/or pose of one or more things (e.g., individuals, animals, objects, structures, events, etc.) measured and/or depicted in the sensor data 402, etc.

In some examples, context analyzer 412 can identify an individual (e.g., a visitor) who is depicted in sensor data 402 based on sensor data 402 and/or user data 404. For example, context analyzer 412 can determine the identity of a person based on a visit frequency, time of visits, facial recognition of the person, user's contact information, etc.

The home agent system 410 can generate a dynamic/automated action(s) 420 based on the analysis of sensor data 402, user data 404, home data 406, and/or any applicable external data. For example, home agent system 410 can predict a user behavior in response to a detected event or condition (e.g., what a user would have done or how a user would have reacted in response to the detected activity or condition) based on a contextual understanding of the detected event, the house, and/or the user.

Based on the predicted user behavior, home agent system 410 can determine dynamic/automated action(s) 420. In some cases, dynamic/automated action(s) 420 can match, mimic or relate to the predicted user behavior. The home agent system 410 can trigger a device(s) of the security system, such as an IoT device(s) of the security system, to execute the dynamic/automated action(s) 420. For example, home agent system 410 can dynamically determine what action can be done by the IoT device(s) on behalf of the user and without user intervention and can trigger the IoT device (s) to perform such action.

In some aspects, dynamic automated action(s) 420 can include automated interaction and/or communication with an individual detected in sensor data 402. For example, dynamic automated action(s) 420 can include outputting audio signals through a speaker (e.g., speaker in doorbell 302) to communicate with an individual (e.g., delivery person 320 as illustrated in FIG. 3) detected within a proximity of the speaker. The audio signals can be customized based on the sensor data 402, user data 404, and/or home data 406. For example, a voiceover can be determined based on an occupant of the house, user preferences, or a type of visitor detected in sensor data 402. The audio signals can then be customized to include or provide the voiceover.

In some examples, dynamic automated action(s) 420 can include granting access to the indoor location (e.g., a house) by triggering a lock to unlock, a door to open, a garage door to open, a gate to open, etc. For example, home agent system 410 can detect an event (e.g., an invited visitor), determine that a user associated with the house is not present in the house or cannot attend to the detected event and that the user would have authorized the invited visitor access to the house. The home agent system 410 can then trigger a door and/or lock to open to allow the invited visitor to gain access to the house. As another example, if sensor data 402 indicates that a scheduled gardener has arrived and home data 406 indicates that user 132 is in a work meeting or on the phone, home agent system 410 can determine an automated action(s) 420 for opening a gate for the gardener. In some examples, dynamic automated action(s) 420 includes a temporary authorization to access the indoor location, which may be revoked by a user at any time or may be automatically revoked after a time threshold and/or based on one or more other factors, such as a schedule, a detected event, a detected activity, etc. The time threshold and/or the one or more other factors can be predetermined based on user data 404.

In some cases, a user (e.g., user 132) can provide user feedback 430 with respect to dynamic automated action(s) 420. The user feedback 430 can include what the user would have done differently if such action(s) was not automated and instead done manually (e.g., changes that can be done to better resemble the user behavior). The user feedback 430 can be provided to home agent system 410. Home agent system 410 can use the user feedback 430 to adjust the dynamic automated action(s). In some examples, user feedback 430 can be used to train ML model 414 to better understand the context and improve the predictions of user behavior.

Figure 5:
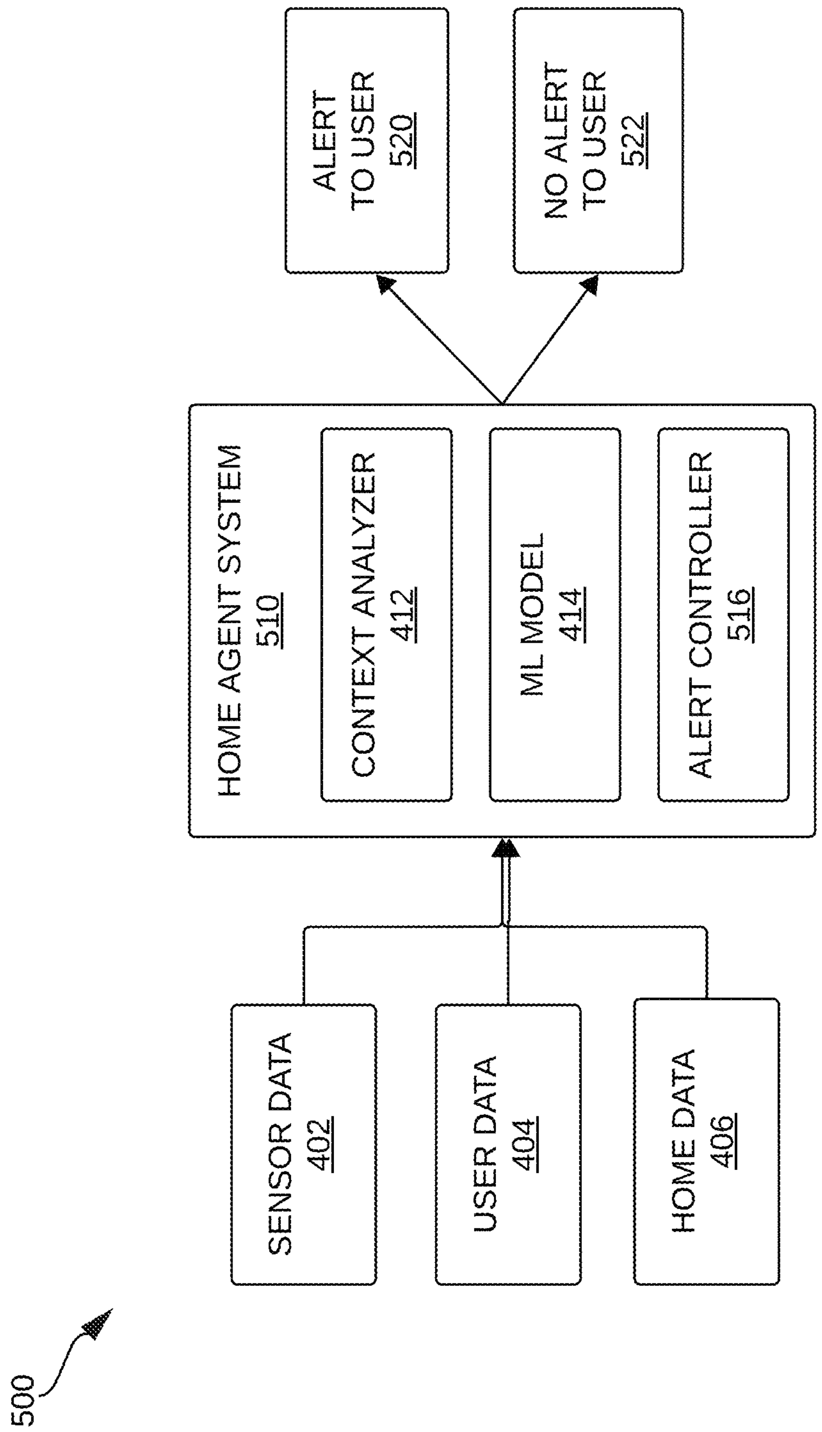
FIG. 5 illustrates an example system for activating/deactivating an alert for a security system, according to some examples of the present disclosure.

FIG. 5 illustrates an example system 500 for activating/deactivating an alert for a security system based on a contextual understanding of the environment. As illustrated, system 500 includes home agent system 510, which functions to determine whether or not to transmit an alert to a user based on an analysis of sensor data 402, user data 404, and/or home data 406.

The various components of system 500 can be implemented at applicable places in the multimedia environment shown in FIG. 1. For example, home agent system 510 can be implemented by media systems 104 (e.g., media device (s) 106) and/or the system server(s) 126). Further, the home agent system 510 can be part of a security system installed in a building structure, a residential home, a commercial building, an office, a room, a retail space (e.g., a store), a restaurant, a school, a classroom, a hotel, a hospital, etc.

The home agent system 510 (similar to or the same as home agent system 410 illustrated in FIG. 4) may receive or access sensor data 402, user data 404, and/or home data 406. As previously described, context analyzer 412 can process and analyze, using ML model 414, sensor data 402, user data 404, and/or home data 406 to determine a context of the environment and an action to implement or trigger (e.g., a predicted action) based at least in part on the context of the environment. Non-limiting examples of a context of the environment can include a detected event or condition outside of a house associated with the environment, a status of the inside of the house, a status of a user in the house, activity in the house, a schedule associated with the house, access permissions and/or restrictions associated with the house, a configuration of the house, devices in the house, access systems at the house, a layout of the house, user preferences associated with the house, occupants of the house, objects in the house, rules associated with the house, statistics associated with the house, a location of the house, etc.

In some aspects, alert controller 516 can determine whether to transmit an alert to user 520 based on the analysis of sensor data 402, user data 404, home data 406, or a combination thereof. The alert controller 516 may determine that a predicted user behavior includes snoozing the notification or alert in response to the detected event outside of the indoor location, and implement such action or a similar/related action (e.g., snoozing the notification or alert, withholding the notification or alert, etc.) in response to the detected event outside of the indoor location. For example, if a solicitor is detected outside the house, alert controller 516 may not transmit alert to user 522 based on user preferences and/or a status of the user (e.g., the user is in a meeting, the user is sleeping in a room, the user is in the bathroom, etc.) determined from user data 404 and/or home data 406.

In some implementations, alert controller 516 may determine that a predicted user behavior includes responding or acknowledging the detected event outside of the indoor location. For example, if a motion event of an invited guest approaching is detected in sensor data 402, alert controller 516 may transmit an alert to user 520 (e.g., chime on a user device, speaker 312, or any applicable speaker placed in the indoor location).

In some aspects, alert controller 516 can customize the notification or alert to the user based on sensor data 402, user data 404, home data 406, or a combination thereof. The alert controller 516 can personalize or adjust the type or form of the notification/alert (e.g., chime, voice call, text message, light, vibration, etc.), a type of sound, a volume, a device(s) to output the notification/alert (e.g., TV 308, alarm clock 310, speaker 312, a user device, etc.), a message included in the notification/alert, and/or any other customization based on the analysis of sensor data 402, user data 404, home data 406, or a combination thereof (e.g., based on what is happening or who is doing what in the indoor location). For example, if home data 406 indicates that a baby is sleeping in the room, alert controller 516 may transmit the notification or alert to IoT devices in the house except any IoT devices in the room (e.g., to avoid waking up or disturbing the baby sleeping in the room). In another example, alert controller 516 may transmit the notification or alert to IoT devices that are located near the user (e.g., within a predetermined distance from a user) based on home data 406, which shows where in the house the user is located. In another example, if home data 406 indicates that a user is watching TV 308, alert controller 516 may transmit the notification to TV 308 to display for the user to ensure that the user will see the notification.

Figure 6:
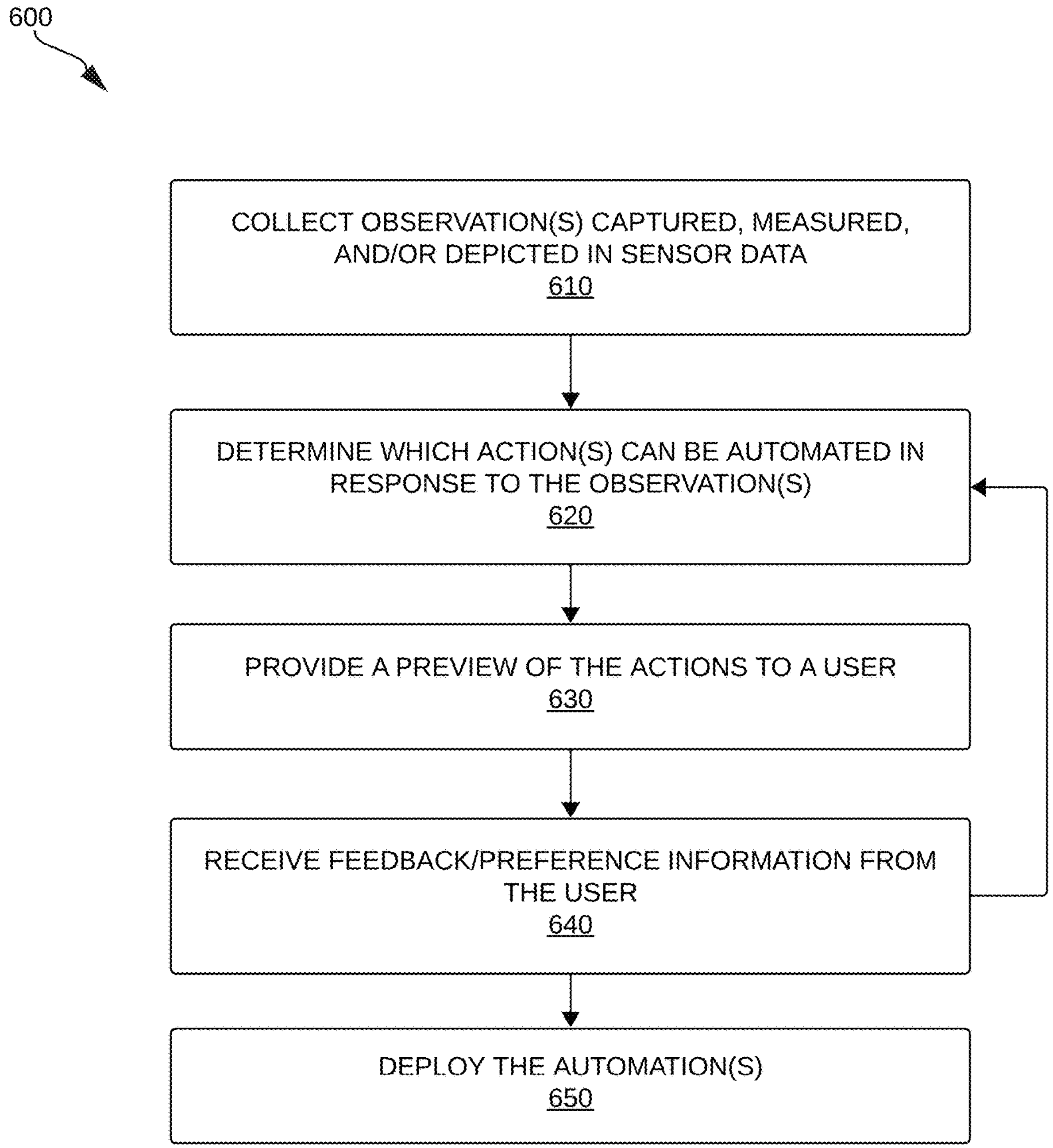
FIG. 6 illustrates a flowchart of an example method for deploying dynamic automation of a security system, according to some examples of the present disclosure.

FIG. 6 is a diagram illustrating a flowchart of an example method 600 for deploying dynamic automation of a security system. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 4. However, method 600 is not limited to that example.

In step 610, home agent system 410 can collect an observation(s) captured, measured, and/or depicted in sensor data. For example, home agent system 410 can collect observations that are captured by one or more sensors (e.g., one or more sensors on doorbell 302, garage security camera 304, etc.) that are installed outside of an indoor location. The observations can include image data (e.g., still images, video frames) and/or audio data that monitors a scene of the indoor location or outside of the indoor location, monitors any objects present outside the indoor location (e.g., within the field of view of the one or more sensors), monitors events and/or activity outside of the indoor location, monitors conditions outside of the indoor location, etc.

In step 620, home agent system 410 can determine which action(s) can be automated in response to the observation(s). For example, home agent system 410 can determine an action(s) that can fulfill or respond to the observation(s) without user intervention. The home agent system 410 can determine any action(s) that can be automatically performed by one or more devices, such as one or more sensors, computers, tools, components, and/or IoT devices (e.g., microphones, speakers, lighting devices, light sensors, temperature sensors, movement/motion sensors, smoke detectors, fans, TVs, monitors, radios, display devices, garage door openers, smart locks, refrigerators, dishwashers, air conditioning units, sprinkler systems, actuators, pumps, and so on) on behalf of the user. As previously described, the action(s) can be based on a predicted user behavior in response to the observations. The user behavior can be predicted based on the contextual understanding of the observation(s), user data, environmental data (e.g., home data 406), and/or any applicable external data.

In step 630, home agent system 410 can provide a preview of the action(s) to a user. For example, home agent system 410 can present a simulation or a preview of the action(s) on a user device (e.g., display device 108, media device 106, a computing device, etc.) prior to activating the action(s) (e.g., prior to triggering one or more devices, such as one or more IoT devices, to perform the action(s)) in response to the observation(s).

In step 640, home agent system 410 can receive feedback/preference information from the user. For example, home agent system 410 can receive feedback from a user (e.g., from a user device) indicating what the user would have done in response to the observation(s) or any changes that the user would like in the action(s). The user feedback can be fed into the home agent system 400, which can adjust the action(s) based on the received user feedback.

In step 650, home agent system 410 can deploy the action(s). For example, home agent system 410 can activate one or more devices, such as one or more IoT devices, to perform the action(s) in response to the observation(s). The one or more devices can perform the action(s) on behalf of the user and without user intervention. For example, home agent system 410 can trigger a speaker on doorbell 302 to output instructions to delivery person 320 using an automated voice-over through the speaker on doorbell 302.

Figure 7:
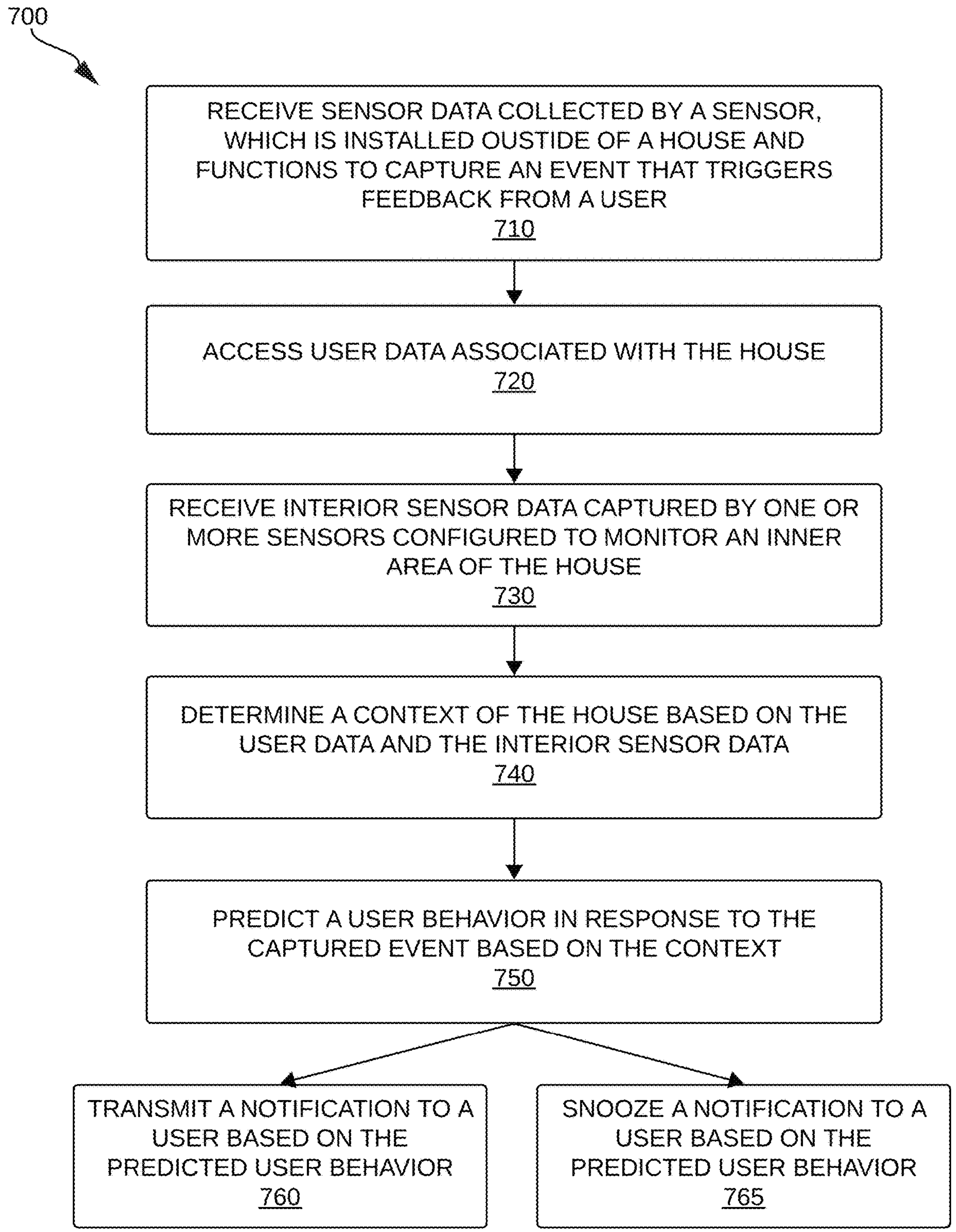
FIG. 7 illustrates a flowchart of an example method for determining activation/deactivation of a security system based on understanding of a context of house status, according to some examples of the present disclosure.

FIG. 7 is a diagram illustrating a flowchart of an example method 700 for determining activation/deactivation of a security system based on understanding of a context of a house, according to some examples of the present disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 5. However, method 700 is not limited to that example.

In step 710, home agent system 510 can receive sensor data collected by a sensor(s). The sensor(s) can include a sensor installed outside of the house. Moreover, the sensor (s) can capture data measuring, describing, and/or depicting an event that triggers feedback from a user. For example, home agent system 510 can receive sensor data 402 collected by a sensor(s) installed outside of a house (e.g., a sensor on doorbell 302, garage security camera 304, etc.). The sensor data 402 can include an indication of an event that triggers feedback from user 132. For example, sensor data 402 can include input (e.g., pushing the doorbell 302) from delivery person 320 at doorbell 302.

In step 720, home agent system 510 can access user data associated with the house. For example, home agent system 510 can access user data 404 associated with the house. As previously described, user data 404 can include user preferences, a purchase history, a calendar, a daily pattern, contact information, social media activities, a house layout, an indication of devices in the house, a location of the house, access permissions and/or restrictions associated with the house, access devices at the house, occupants of the house, objects in the house, a configuration of the house, house information, or a combination thereof.

In step 730, home agent system 510 can receive interior sensor data captured by one or more sensors configured to monitor an inner area of the house. For example, home agent system 510 can receive home data 406, which includes interior sensor data captured by a sensor(s) configured to monitor the inner area of the house (e.g., cameras 306A-C). The interior sensor data (e.g., home data 406) can help context analyzer 412 understand the context of the house, such as a status of the house, what is happening in the house, what a user is doing in the house, how many users are in the house, any animals in the house, a configuration of the house, a status of an occupant of the house, a status of security devices at the house, an event in the house, an event outside of the house, etc.

In step 740, home agent system 510 can determine a context of the house based on the user data and the interior sensor data. For example, home agent system 510 (e.g., context analyzer 412) can determine, using ML model 414, a status of the house based on user data 404 and home data 406.

In step 750, home agent system 510 can predict a user behavior in response to the event included in the sensor data received at step 710. For example, based on the contextual understanding of the indoor location (e.g., a house), user, and the environment, context analyzer 412 can predict a user behavior in response to the event or condition occurring outside the house as included in the sensor data received at step 710. Further, home agent system 510 can determine whether or not to transmit a notification to a user regarding the detected event or condition occurring outside the house based on the predicted user behavior.

In step 760, home agent system 510 can transmit, in response to determining that a predicted user behavior includes responding to or acknowledging the detected event or condition, transmitting a notification to a user based on the context. For example, if home agent system 510 determines that the user is predicted to respond or take an action in response to the detected event or condition occurring outside of the house, home agent system 510 may transmit a notification or alert to one or more user devices. Here, the notification or alert can provide a response to the detected event or condition, and the response can include or be based on the predicted user behavior and/or can include a response that matches, is similar to, and/or relates to the predicted user behavior.

In step 765, in response to determining that a predicted user behavior includes ignoring or dismissing the detected event or condition, the home agent system 510 can deactivate a notification to a user based on the context. Here, deactivating the notification can include snoozing the notification, stopping the notification, blocking the notification, silencing the notification, terminating the notification, pausing the notification, and/or postponing the notification. For example, if home agent system 510 determines that the user would likely ignore the detected event or condition based on the context of the detected event or condition, user, and/or the environment, home agent system 510 may not transmit a notification or alert to a user device to prevent that user device from outputting the notification or alert for the user.

Figure 8:
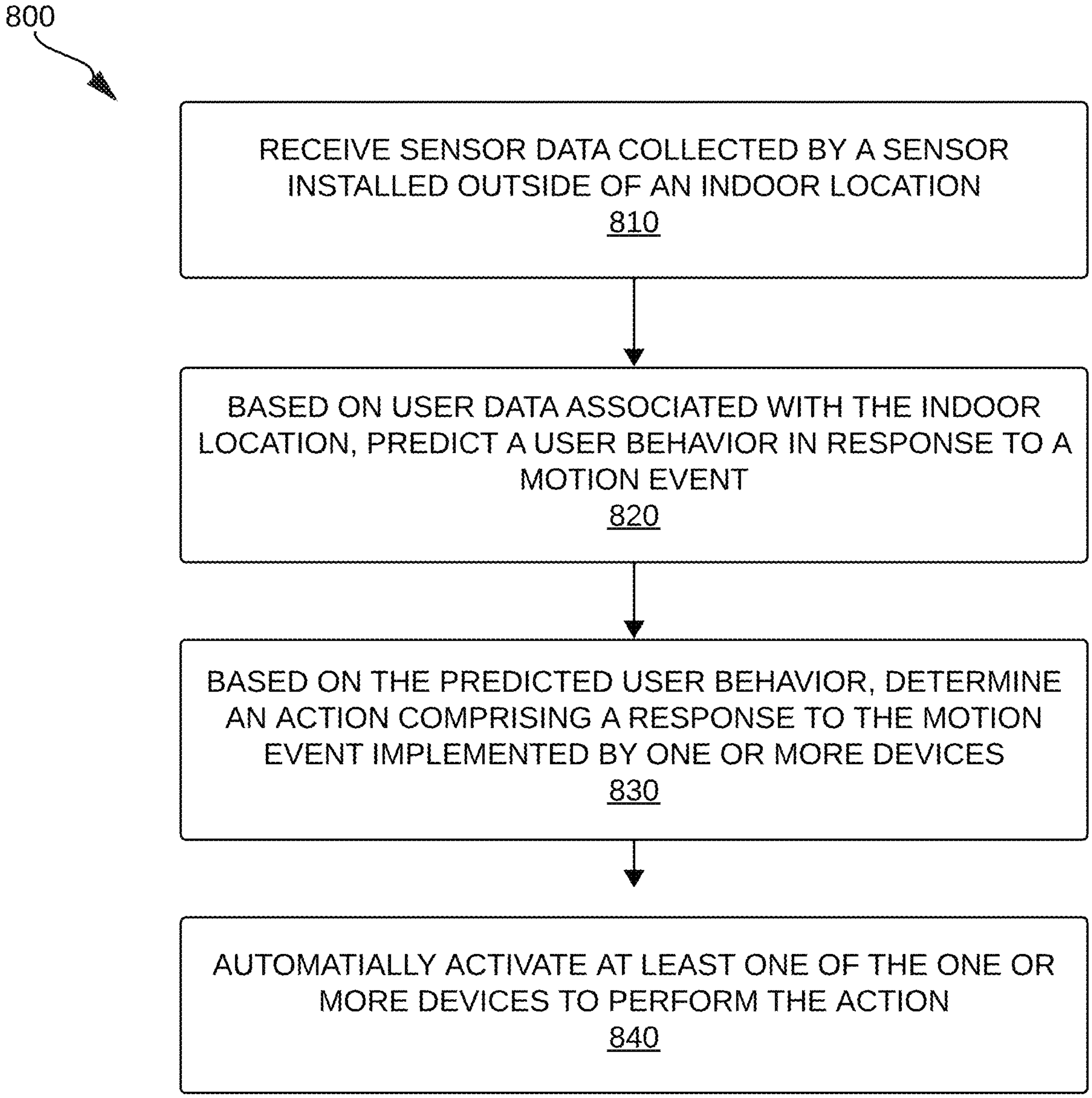
FIG. 8 illustrates a flowchart of an example method for dynamically automating IoT devices using machine learning, according to some examples of the present disclosure.

FIG. 8 is a diagram illustrating a flowchart of an example method 800 for dynamically automating a security system, using machine learning, based on the contextual understanding of the detected event, the environment, and/or the user, according to some examples of the present disclosure.

Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. Method 800 shall be described with reference to FIG. 4. However, method 800 is not limited to that example.

In step 810, home agent system 410 can receive sensor data collected by a sensor installed outside of a house. The sensor data may include an indication of motion, an event, a condition, a state/status, a context, and/or activity occurring within a predetermined distance from the indoor location. For example, home agent system 410 can receive sensor data 402 collected by a sensor(s) installed outside of a house (e.g., a sensor associated with doorbell 302, garage security camera 304, etc.). The sensor data 402 can include, for example, an indication of motion, an event, a condition, a state/status, a context, and/or an activity occurring within a predetermined distance from the house such as a delivery event, a visitor event, an egress event, an ingress event, a trespass event, etc.

In step 820, home agent system 410 can predict, based on user data associated with the indoor location, a user behavior in response to the indication of the motion, event, condition, state/status, context, and/or activity occurring within the predetermined distance from the indoor location. For example, home agent system 410 (e.g., context analyzer 412) can predict, based on user data 404, a user behavior in response to the motion and/or event, which is detected in sensor data 402. Non-limiting examples of user data 404 include user preferences, a purchase history, a calendar, a daily pattern, contact information, social media activities, or a combination thereof.

For example, home agent system 410 (e.g., context analyzer 412) can access user data 404 that shows a user's recent purchase that is scheduled to be delivered by a delivery person and predict that a user is going to authorize the delivery person to leave the package at a location relative to the indoor location, such as an outdoor location or entrance. In another example, if the user's calendar indicates that a gardener is scheduled to go to the house of the user, home agent system 410 (e.g., context analyzer 412) can predict that the user would authorize access to the garden (e.g., opening the gate) for the gardener.

In some aspects, the user behavior can be predicted based on environmental data that represents a status of the indoor location or user 132. The environmental data can include home data 406, which includes indoor sensor data captured by a sensor(s) placed inside of the indoor location (e.g., house). For example, if indoor sensor data captured by camera 306C indicates that a baby is sleeping in the room, home agent system 410 (e.g., context analyzer 412) can predict that the user would likely snooze the chime when a solicitor shows up at the door of the home. In another example, if indoor sensor data indicates that the user is on the phone, home agent system 410 (e.g., context analyzer 412) may predict that the user might want to ask a delivery person to wait a couple of minutes until the user is off the phone.

In some examples, the user behavior can be predicted based on external data, which includes traffic data, weather data, delivery status data, or a combination thereof. For example, if weather data indicates that it is going to rain later that day, home agent system 410 (e.g., context analyzer 412) can predict that the user may ask a delivery person to leave the package inside the garage rather than on the porch.

In some implementations, the user behavior can be predicted, using ML model 414 (e.g., neural network), based on the user data, environmental data, external data, or a combination thereof. For example, home agent system 410 can generate, using ML model 414, predictions of a user behavior based on user data 404, environmental data indicating a status of the indoor location or sensor, and/or external data.

In some cases, ML model 414 can generate prediction(s) of user behavior along with a level of uncertainty of the predicted user behavior(s) (e.g., a confidence score). For example, when a friend of user 132 comes over as indicated in the user's calendar, but the friend has grown a beard since last identified by home agent system 410, home agent system 410 may, using ML model 414, generate predicted user behavior along with its certainty/uncertainty (e.g., facial recognition accuracy or face matching percentage). If the level of uncertainty is above a predetermined uncertainty threshold or the confidence score (e.g., accuracy or certainty in percentage, etc.) is below a predetermined confidence threshold, home agent system 410 can transmit a notification requesting input from the system owner (e.g., user 132). For example, home agent system 410 can transmit a request with an image of the guest, which is captured by sensor(s) outside of the house to verify or confirm the identity of the guest.

In step 830, home agent system 410 can determine, based on the predicted user behavior, an action in response to the motion, event, condition, state/status, activity, and/or context occurring within the predetermined distance from the indoor location. The action can include a response to the motion, event, context, condition, state/status, and/or activity by one or more devices, such as one or more IoT devices. For example, home agent system 410 can determine, based on the predicted user behavior at step 820, an action (e.g., dynamic automated action(s) 420) that includes a response to the motion event by an IoT device(s). For example, home agent system 410 can determine an action that mimics the predicted user behavior (e.g., what a user would have done or how a user would have reacted in response to the detected event, motion, activity, context, state/status, and/or condition) and can be performed by one or more devices, such as one or more IoT devices (e.g., TV 308, alarm clock 310, speaker 312, a door lock, a garage door opener, or any applicable IoT device, etc.). In some aspects, home agent system 410 can determine, using ML model 414 (e.g., neural network) an action (e.g., dynamic automated action(s) 420) based on the predicted user behavior.

In some cases, dynamic automated action(s) 420 can include outputting audio signals to interact or communicate with a person detected in sensor data 402. For example, home agent system 410 can determine an automated interaction/communication, through a microphone and speaker in doorbell 302, to communicate with a delivery person 320 in a manner that a user would have. The home agent system 410 can alter or customize the audio signals based on sensor data 402, user data 404, or home data 406. For example, a voiceover can be determined based on an occupant of the house, user preferences, or a type of visitor detected in sensor data 402.

In some examples, dynamic automated action(s) 420 can include granting access to the indoor location (e.g., a house). For example, home agent system 410 can predict, when a user is not present or cannot attend to an invited visitor, that a user would have authorized the invited visitor access to the house. For example, if sensor data 402 indicates that a scheduled gardener has arrived and home data 406 indicates that user 132 is in a work meeting or on the phone, home agent system 410 can determine an automated action(s) 420, which would include opening a gate for the gardener.

In some examples, dynamic automated action(s) 420 includes a temporary authorization to access the indoor location, which may be revoked by the user or automatically revoked based on one or more factors (e.g., after a time threshold, etc.). The time threshold can be predetermined based on user data 404 (e.g., user preferences, schedules, etc.). For example, user data 404 may indicate that a cleaner is coming to clean the house, home agent system 410 may authorize temporary access to the house.

In some aspects, dynamic automated action(s) 420 can include deactivation of transmitting a notification or alert to user 132. For example, if home data 406 indicates that a baby is sleeping in a room, home agent system 410 may deactivate a chime in the room. In some examples, home agent system 410 or alert controller 516 may adjust the alert setting based on home data 406. For example, if home data 406 indicates that a user is watching TV 308, home agent system 410 or alert controller 516 may transmit the notification to appear on TV 308. In another example, if user data 404 and/or home data 406 indicates that a user should not be disrupted by a chime (e.g., when a user is sleeping, in a meeting, or on the phone), home agent system 410 or alert controller 516 may deactivate transmitting the notification or customize the notification or alert (e.g., change the chime to a light signal (e.g., flashing lights) or a text message, etc.).

In step 840, home agent system 410 can automatically activate at least one device, such as one or more IoT devices, to perform the action. For example, home agent system 410 can automatically activate at least one IoT device(s) (e.g., speaker 312, a garage door opener, a door lock, and so on) to perform the action on behalf of the user, without or with minimal input from a user.

Figure 9:
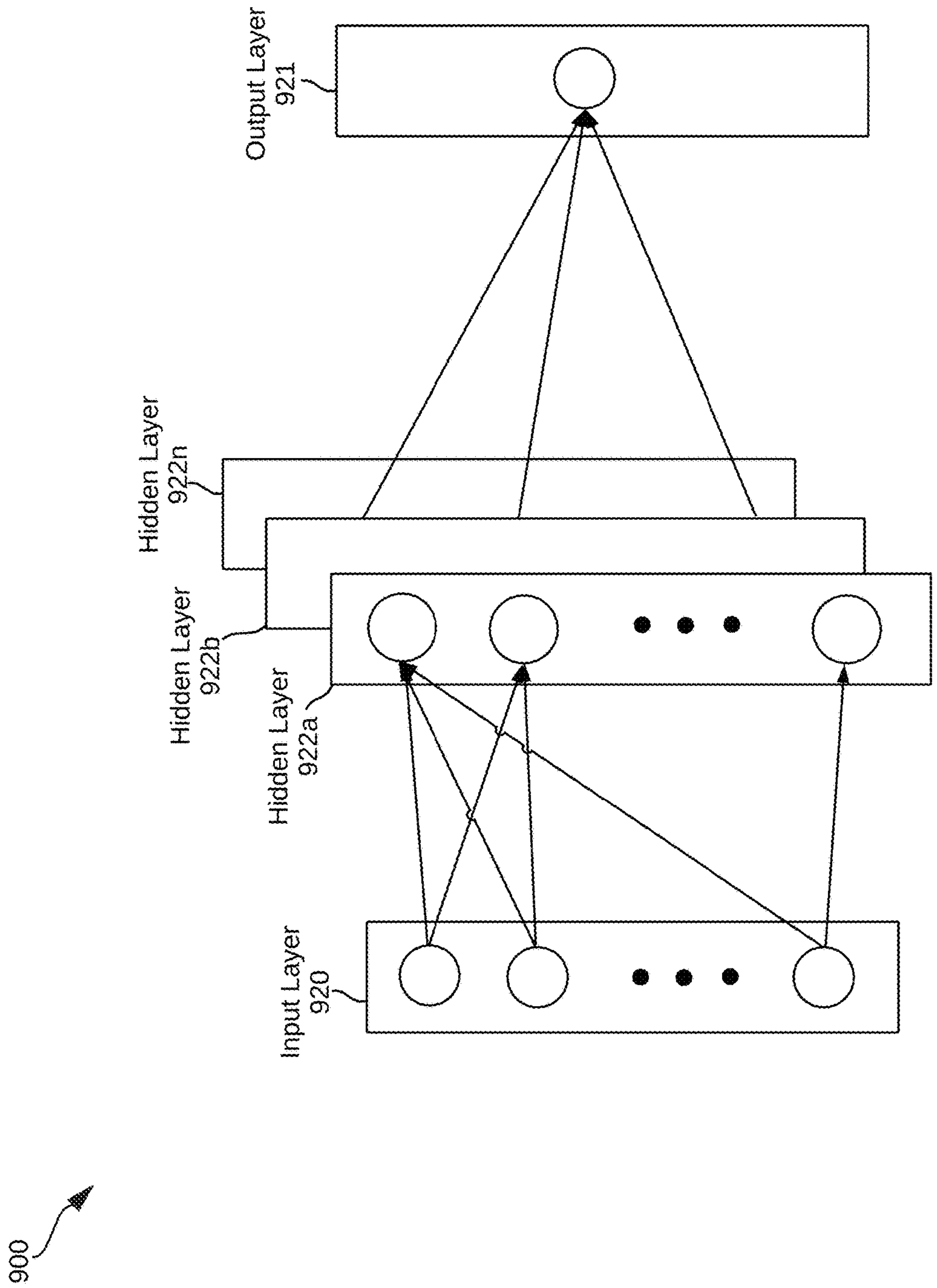
FIG. 9 is a diagram illustrating an example of a neural network architecture, according to some examples of the present disclosure.

FIG. 9 is a diagram illustrating an example of a neural network architecture 900 that can be used to implement some or all of the neural networks described herein (e.g., ML model 414). The neural network architecture 900 can include an input layer 920 can be configured to receive and process data to generate one or more outputs. The neural network architecture 900 also includes hidden layers 922*a*, 922*b*, through 922*n*. The hidden layers 922*a*, 922*b*, through 922*n* include "n" number of hidden layers, where "n" is an integer greater than or equal to one. The number of hidden layers can be made to include as many layers as needed for the given application. The neural network architecture 900 further includes an output layer 921 that provides an output resulting from the processing performed by the hidden layers 922*a*, 922*b*, through 922*n*.

The neural network architecture 900 is a multi-layer neural network of interconnected nodes. Each node can represent a piece of information. Information associated with the nodes is shared among the different layers and each layer retains information as information is processed. In some cases, the neural network architecture 900 can include a feed-forward network, in which case there are no feedback connections where outputs of the network are fed back into itself. In some cases, the neural network architecture 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922*a*. For example, as shown, each of the input nodes of the input layer 920 is connected to each of the nodes of the first hidden layer 922*a*. The nodes of the first hidden layer 922*a* can transform the information of each input node by applying activation functions to the input node information. The information derived from the transformation can then be passed to and can activate the nodes of the next hidden layer 922*b*, which can perform their own designated functions. Example functions include convolutional, up-sampling, data transformation, and/or any other suitable functions. The output of the hidden layer 922*b* can then activate nodes of the next hidden layer, and so on. The output of the last hidden layer 922*n* can activate one or more nodes of the output layer 921, at which an output is provided. In some cases, while nodes in the neural network architecture 900 are shown as having multiple output lines, a node can have a single output and all lines shown as being output from a node represent the same output value.

In some cases, each node or interconnection between nodes can have a weight that is a set of parameters derived from the training of the neural network architecture 900. Once the neural network architecture 900 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network architecture 900 to be adaptive to inputs and able to learn as more and more data is processed.

The neural network architecture 900 is pre-trained to process the features from the data in the input layer 920 using the different hidden layers 922*a*, 922*b*, through 922*n* in order to provide the output through the output layer 921.

In some cases, the neural network architecture 900 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network architecture 900 is trained well enough so that the weights of the layers are accurately tuned.

To perform training, a loss function can be used to analyze an error in the output. Any suitable loss function definition can be used, such as a Cross-Entropy loss. Another example of a loss function includes the mean squared error (MSE), defined as E_total=Σ(½ (target-output)^2). The loss can be set to be equal to the value of E_total.

The loss (or error) will be high for the initial training data since the actual values will be much different than the predicted output. The goal of training is to minimize the amount of loss so that the predicted output is the same as the training output. The neural network architecture 900 can perform a backward pass by determining which inputs (weights) most contributed to the loss of the network, and can adjust the weights so that the loss decreases and is eventually minimized.

The neural network architecture 900 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network architecture 900 can include any other deep network other than a CNN, such as an autoencoder, Deep Belief Nets (DBNs), Recurrent Neural Networks (RNNs), among others.

As understood by those of skill in the art, machine-learning based techniques can vary depending on the desired implementation. For example, machine-learning schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Computer System

Figure 10:
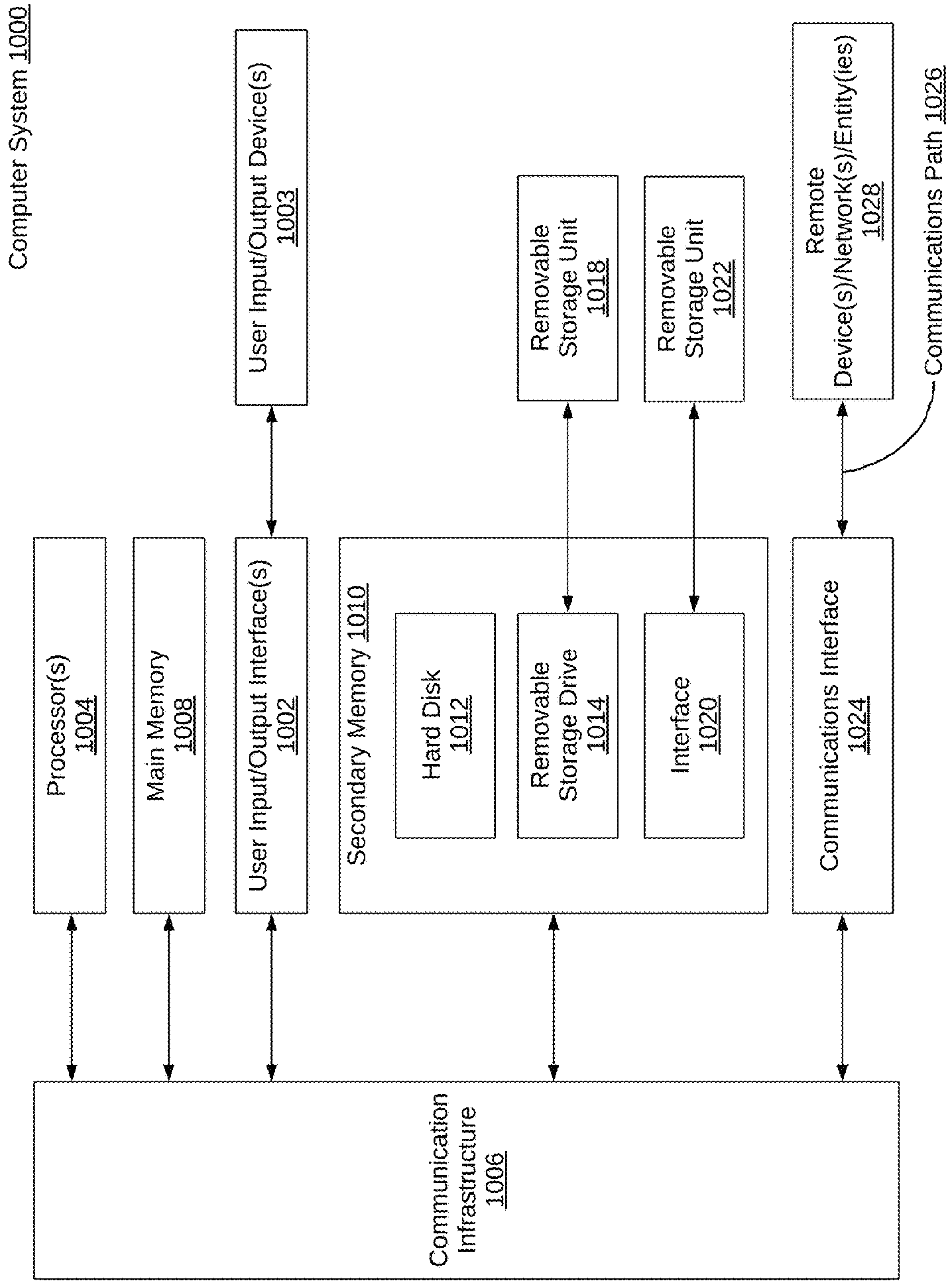
FIG. 10 illustrates an example computer system that can be used for implementing various aspects of the present disclosure.

Various aspects and examples may be implemented, for example, using one or more well-known computer systems, such as computer system 1000 shown in FIG. 10. For example, the media device 106 and/or home agent system 410, 510 may be implemented using combinations or sub-combinations of computer system 1000. Also or alternatively, one or more computer systems 1000 may be used, for example, to implement any of the aspects and examples discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (e.g., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system xx00 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communications path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: memory; and one or more processors coupled to the memory and configured to perform operations comprising: receiving sensor data collected by a sensor installed outside of an indoor location, wherein the sensor data comprises an indication of a motion event occurring within a predetermined distance from the indoor location; based on user data associated with the indoor location, predicting, using a neural network, a user behavior in response to the motion event; based on the predicted user behavior, determining, using the neural network, an action comprising a response to the motion event implemented by one or more devices; and automatically activating at least one of the one or more devices to perform the action.

Aspect 2. The system of Aspect 1, wherein the user data comprises environmental data that represents a status of the indoor location or a user, wherein the environmental data is captured by one or more sensors placed inside of the indoor location.

Aspect 3. The system of any of Aspects 1 to 2, wherein the one or more processors are configured to perform operations further comprising: predicting, based on external data, the user behavior in response to the motion event, wherein the external data comprises at least one of traffic data, weather data, and delivery status data.

Aspect 4. The system of any of Aspects 1 to 3, wherein the action includes outputting audio signals, wherein the one or more processors are configured to perform operations further comprising: altering the audio signals based on the user data.

Aspect 5. The system of any of Aspects 1 to 4, wherein the user data comprises at least one of user preferences, a purchase history, a calendar, a daily pattern, contact information, and social media activities, and wherein the motion event includes at least one of a delivery event, a visitor event, an egress event, an ingress event, and a trespass event.

Aspect 6. The system of any of Aspects 1 to 5, further comprising the one or more devices, wherein the one or more devices comprise at least one of an Internet-of-Things (IOT) device, a sensor, a lock, a computer, and a tool.

Aspect 7. The system of any of Aspects 1 to 6, wherein the action includes a deactivation of transmitting a notification to a user.

Aspect 8. The system of any of Aspects 1 to 7, wherein the action comprises a temporary authorization to access the indoor location, wherein the temporary authorization is revoked after a time threshold, wherein the time threshold is predetermined based on the user data.

Aspect 9. The system of any of Aspects 1 to 8, wherein the one or more processors are configured to perform operations further comprising: presenting a simulation of the action on a user device.

Aspect 10. The system of any of Aspects 1 to 9, wherein the one or more processors are configured to perform operations further comprising: receiving user feedback regarding the action; and updating the activation of the at least one of the one or more IoT devices to adjust the action.

Aspect 11. A method comprising: receiving sensor data collected by a sensor installed outside of an indoor location, wherein the sensor data comprises an indication of a motion event occurring within a predetermined distance from the indoor location; based on user data associated with the indoor location, predicting, using a neural network, a user behavior in response to the motion event; based on the predicted user behavior, determining, using the neural network, an action comprising a response to the motion event implemented by one or more devices; and automatically activating at least one of the one or more devices to perform the action.

Aspect 12. The method of Aspect 11, wherein the user data comprises environmental data that represents a status of the indoor location or a user, wherein the environmental data is captured by one or more sensors placed inside of the indoor location.

Aspect 13. The method of any of Aspects 11 to 12, further comprising: predicting, based on external data, the user behavior in response to the motion event, wherein the external data comprises at least one of traffic data, weather data, and delivery status data.

Aspect 14. The method of any of Aspects 11 to 13, wherein the action includes outputting audio signals, wherein the method further comprises: altering the audio signals based on the user data.

Aspect 15. The method of any of Aspects 11 to 14, wherein the user data comprises at least one of user preferences, a purchase history, a calendar, a daily pattern, contact information, and social media activities, and wherein the motion event includes at least one of a delivery event, a visitor event, an egress event, an ingress event, and a trespass event.

Aspect 16. The method of any of Aspects 11 to 15, wherein the one or more devices comprise at least one of an Internet-of-Things (IOT) device, a sensor, a lock, a computer, and a tool.

Aspect 17. The method of any of Aspects 11 to 16, wherein the action includes a deactivation of transmitting a notification to a user.

Aspect 18. The method of any of Aspects 11 to 17, wherein the action comprises a temporary authorization to access the indoor location, wherein the temporary authorization is revoked after a time threshold, wherein the time threshold is predetermined based on the user data.

Aspect 19. The method of any of Aspects 11 to 18, further comprising: presenting a simulation of the action on a user device.

Aspect 20. A non-transitory computer-readable medium having instructions stored thereon that, when executed by at least one computing device, cause the one or more processors to perform a method according to any of Aspects 11 to 19.

Aspect 21. A system comprising means for performing a method according to any of Aspects 11 to 19.

Aspect 22. A computer program product having stored thereon instructions which, when executed by one or more processors, cause the one or more processors to perform a method according to any of Aspects 11 to 19.

What is claimed is:

1. A system comprising:

memory; and one or more processors coupled to the memory and configured to perform operations comprising:

receiving sensor data collected by a sensor installed outside of an indoor location, wherein the sensor data comprises an indication of a motion event occurring within a predetermined distance from the indoor location;

based on user data associated with the indoor location, predicting, using a neural network, a user behavior in response to the motion event, wherein the user data comprises at least one of user preferences, a purchase history, a calendar, a daily pattern, contact information, and social media activities, and wherein the motion event includes at least one of a delivery event, a visitor event, an egress event, an ingress event, and a trespass event;

in response to determining that the predicted user behavior satisfies a confidence metric, determining, using the neural network, an action comprising a response to the motion event implemented by one or more devices; and automatically activating at least one of the one or more devices to perform the action.

2. The system of claim 1, wherein the user data comprises environmental data that represents a status of the indoor location or a user, wherein the environmental data is captured by one or more sensors placed inside of the indoor location.

3. The system of claim 1, wherein the one or more processors are configured to perform operations further comprising:

predicting, based on external data, the user behavior in response to the motion event, wherein the external data comprises at least one of traffic data, weather data, and delivery status data.

4. The system of claim 1, wherein the action includes outputting audio signals, wherein the one or more processors are configured to perform operations further comprising:

altering the audio signals based on the user data.

5. The system of claim 1, further comprising the one or more devices, wherein the one or more devices comprise at least one of an Internet-of-Things (IoT) device, a sensor, a lock, a computer, and a tool.

6. The system of claim 1, wherein the action includes a deactivation of transmitting a notification to a user.

7. The system of claim 1, wherein the action comprises a temporary authorization to access the indoor location, wherein the temporary authorization is revoked after a time threshold, wherein the time threshold is predetermined based on the user data.

8. The system of claim 1, wherein the one or more processors are configured to perform operations further comprising:

presenting a simulation of the action on a user device.

9. The system of claim 1, wherein the one or more processors are configured to perform operations further comprising:

receiving user feedback regarding the action; and updating the activation of the at least one of the one or more devices to adjust the action.

10. A method comprising:

receiving sensor data collected by a sensor installed outside of an indoor location, wherein the sensor data comprises an indication of a motion event occurring within a predetermined distance from the indoor location;

based on user data associated with the indoor location, predicting, using a neural network, a user behavior in response to the motion event, wherein the user data comprises at least one of user preferences, a purchase history, a calendar, a daily pattern, contact information, and social media activities, and wherein the motion event includes at least one of a delivery event, a visitor event, an egress event, an ingress event, and a trespass event;

in response to determining that the predicted user behavior satisfies a confidence metric, determining, using the neural network, an action comprising a response to the motion event implemented by one or more devices; and automatically activating at least one of the one or more devices to perform the action.

11. The method of claim 10, wherein the user data comprises environmental data that represents a status of the indoor location or a user, wherein the environmental data is captured by one or more sensors placed inside of the indoor location.

12. The method of claim 10, further comprising:

predicting, based on external data, the user behavior in response to the motion event, wherein the external data comprises at least one of traffic data, weather data, and delivery status data.

13. The method of claim 10, wherein the action includes outputting audio signals, wherein the method further comprises:

altering the audio signals based on the user data.

14. The method of claim 10, wherein the one or more devices comprise at least one of an Internet-of-Things (IoT) device, a sensor, a lock, a computer, and a tool.

15. The method of claim 10, wherein the action includes a deactivation of transmitting a notification to a user.

16. The method of claim 10, wherein the action comprises a temporary authorization to access the indoor location, wherein the temporary authorization is revoked after a time threshold, wherein the time threshold is predetermined based on the user data.

17. The method of claim 10, further comprising:

presenting a simulation of the action on a user device.

18. A non-transitory computer-readable medium having instructions stored thereon that, when executed by one or more processors, cause the one or more processors to perform operations comprising:

receiving sensor data collected by a sensor installed outside of an indoor location, wherein the sensor data comprises an indication of a motion event occurring within a predetermined distance from the indoor location;

based on user data associated with the indoor location, predicting, using a neural network, a user behavior in response to the motion event, wherein the user data comprises at least one of user preferences, a purchase history, a calendar, a daily pattern, contact information, and social media activities, and wherein the motion event includes at least one of a delivery event, a visitor event, an egress event, an ingress event, and a trespass event;

in response to determining that the predicted user behavior satisfies a confidence metric, determining, using the neural network, an action comprising a response to the motion event implemented by one or more devices; and automatically activating at least one of the one or more devices to perform the action.

* * * * *